(12) United States Patent
Paller et al.

(10) Patent No.: US 8,683,993 B2
(45) Date of Patent: Apr. 1, 2014

(54) HEADER BOX FOR A FURNACE, A FURNACE INCLUDING THE HEADER BOX AND A METHOD OF CONSTRUCTING A FURNACE

(75) Inventors: Hans J. Paller, Double Oak, TX (US); Glenn W. Kowald, Carrollton, TX (US)

(73) Assignee: Lennox Industries, Inc., Richardson, TX (US)

( * ) Notice: Subject to any disclaimer, the term of this patent is extended or adjusted under 35 U.S.C. 154(b) by 932 days.

(21) Appl. No.: 12/834,375

(22) Filed: Jul. 12, 2010

(65) Prior Publication Data

US 2011/0174471 A1 Jul. 21, 2011

Related U.S. Application Data

(60) Provisional application No. 61/295,501, filed on Jan. 15, 2010.

(51) Int. Cl.
*F24H 3/06* (2006.01)

(52) U.S. Cl.
USPC .................................. 126/110 R; 126/116 R

(58) Field of Classification Search
USPC ....... 126/110 R, 110 C, 116 R, 116 A, 110 A
See application file for complete search history.

(56) References Cited

U.S. PATENT DOCUMENTS

| | | | |
|---|---|---|---|
| 4,309,947 A | 1/1982 | Ketterer | |
| 4,481,935 A | 11/1984 | Bawel | |
| 4,603,680 A | 8/1986 | Dempsey et al. | |
| 5,320,087 A | 6/1994 | Froman | |
| 5,347,980 A | 9/1994 | Shellenberger | |
| 5,375,586 A | 12/1994 | Schumacher et al. | |
| 5,448,986 A | 9/1995 | Christopher et al. | |
| 5,582,159 A | 12/1996 | Harvey et al. | |
| 5,623,918 A | 4/1997 | Swilik, Jr. et al. | |
| 5,704,343 A * | 1/1998 | Ahn et al. | 126/110 R |
| 5,749,355 A | 5/1998 | Roan et al. | |
| 5,775,318 A * | 7/1998 | Haydock et al. | 126/110 R |
| 5,799,646 A | 9/1998 | Zia et al. | |
| 7,036,498 B2 | 5/2006 | Riepenhoff et al. | |
| 8,056,553 B2 * | 11/2011 | Khan | 126/116 R |
| 2012/0090591 A1 * | 4/2012 | Rieke et al. | 126/116 R |

* cited by examiner

*Primary Examiner* — Craig Schneider
*Assistant Examiner* — Craig J Price

(57) ABSTRACT

A CEHB, a furnace and a method of constructing a furnace are disclosed. In one embodiment, the CEHB includes: (1) a fixed orifice configured to regulate air flow through a heat exchanger of the furnace, wherein a combustion air inducer induces the air flow and (2) a negative pressure channel including a negative channel supply port that communicates with an inlet of the combustion air inducer, a negative pressure port configured to connect to a negative input port of a pressure switch and bleed ports configured to reduce a pressure received through the negative channel supply port at the inlet to a targeted range at the negative pressure port, the pressure switch configured to monitor a combustion pressure through the heat exchanger.

20 Claims, 5 Drawing Sheets

HEADER BOX FOR A FURNACE, A FURNACE INCLUDING THE HEADER BOX AND A METHOD OF CONSTRUCTING A FURNACE

CROSS-REFERENCE TO RELATED APPLICATION

This application claims the benefit of U.S. Provisional Application Ser. No. 61/295,501, filed by Shailesh S. Monohar, et al., on Jan. 15, 2010, entitled "An Improved Heating Furnace for a HVAC System," and incorporated herein by reference.

TECHNICAL FIELD

This application is directed, in general, to furnaces and, more specifically, to conditioning a pressure signal of the furnace.

BACKGROUND

HVAC systems can be used to regulate the environment within an enclosure. Typically, an air blower is used to pull air from the enclosure into the HVAC system through ducts and push the air back into the enclosure through additional ducts after conditioning the air (e.g., heating or cooling the air). For example, a furnace, such as a gas furnace may be used to heat the air.

High efficiency residential gas-fired appliances typically rely on a mechanical means, such as a combustion air inducer, to create controlled mass flow thru the flue side of the appliance heat exchanger. For flow to occur, a pressure differential must exist across the heat train of the furnace. To verify that the proper pressure drop and flow are achieved and maintained to support the combustion process of the furnace within safe limits, pressure sensing devices are typically employed. These pressure sensing devices might include mechanical differential pressure switches or electronic sensors which provide feedback to an integrated electronic control.

The components of a furnace which create, control and sense flow thru the heat exchangers are typically designed to be employed on multiple size furnaces (low to high input). Accordingly, the various components are sized to handle the range of inputs. This type of furnace design is similar among industry manufacturers, and typically employs a flue gas/condensate collector box attached to the end of the condenser coil (referred to herein as a Cold End Header Box (CEHB)), a combustion air inducer fan assembly (CAI), a fixed orifice located in the CAI or CEHB to regulate flow through the heat train, and a pressure sensing device to monitor flow. The pressure sensing device could be used to monitor pressure across the fixed orifice, or other points in the heat train to provide the most advantageous signal for the application.

SUMMARY

In one aspect, the disclosure provides a CEHB. In one embodiment, the CEHB includes: (1) a fixed orifice configured to regulate air flow through a heat exchanger of the furnace, wherein a combustion air inducer induces the air flow and (2) a negative pressure channel including a negative channel supply port that communicates with an inlet of the combustion air inducer, a negative pressure port configured to connect to a negative input port of a pressure switch and bleed ports configured to reduce a pressure received through the negative channel supply port at the inlet to a targeted range at the negative pressure port, the pressure switch configured to monitor a combustion pressure through the heat exchanger.

In another aspect, a furnace is disclosed. In one embodiment, the furnace includes: (1) a heat exchanger, (2) a combustion air inducer configured to generate air flow through the heat exchanger, (3) a pressure switch configured to monitor a combustion pressure through the heat exchanger and (4) a header box configured to be coupled between the heat exchanger and the combustion air inducer. The header box having: (4A) a fixed orifice configured to regulate the air flow and (4B) a negative pressure channel including a negative channel supply port that communicates with an inlet of the combustion air inducer, a negative pressure port configured to connect to a negative input port of the pressure switch and bleed ports configured to reduce a pressure received through the negative channel supply port at the inlet to a targeted range at the negative pressure port.

In yet another aspect, a method of constructing a furnace is disclosed. In one embodiment, the method includes: (1) placing a heat exchanger in a housing, (2) positioning a blower in the housing wherein the blower can move air across the heat exchanger and (3) connecting a header box to the heat exchanger, wherein the header box includes an integrated combustion pressure conditioning system.

BRIEF DESCRIPTION

Reference is now made to the following descriptions taken in conjunction with the accompanying drawings, in which.

DETAILED DESCRIPTION

Figure 1:
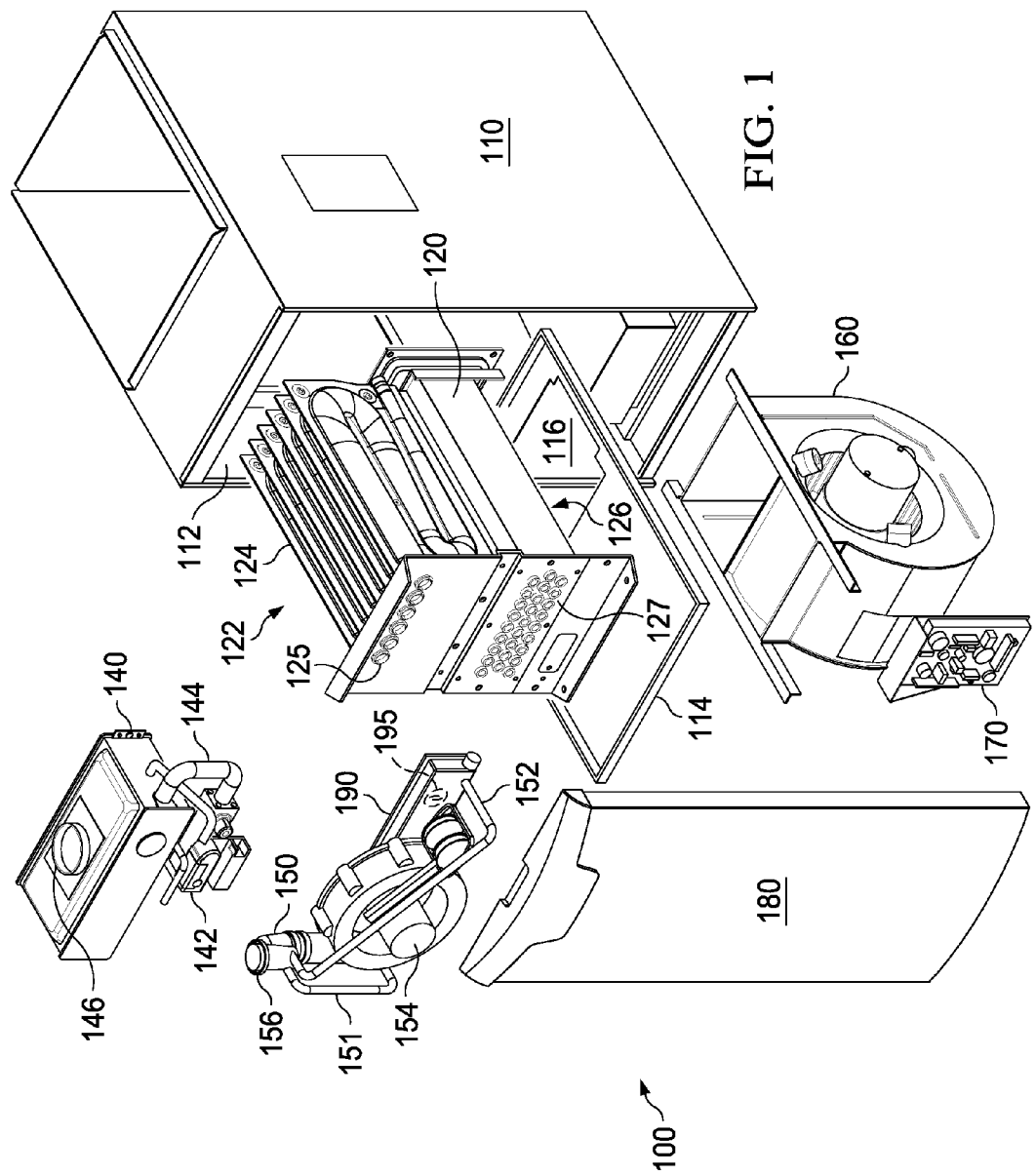
FIG. 1 is an exploded isometric view of a portion of an embodiment of a furnace constructed according to the principles of the disclosure.

As furnace input size increases, required heat exchanger surface area increases proportionately. The combustion pressure that is measured to monitor this type of flue system typically varies with the furnace input size due to the increased heat exchanger size and mass flow rate, and subsequent increase in metering orifice diameter. As such, the resulting differential combustion pressure is typically different for each size input furnace, requiring a number of different pressure switches (due to different set points) for a given model family of furnaces. In the case of an electronic pressure sensor, a dedicated integrated controller may be required or, alternatively, complicated controller firmware with model specific table values to manage this varying furnace parameter.

The varying differential combustion pressure within units in a same model family further complicates the development of multi-stage furnace product which utilizes a "gas-air" system to achieve the varying firing rates. In this system, the differential combustion pressure across the heat exchanger (which verifies proper flow) is linked to the gas valve controlling firing rate (manifold pressure) pneumatically. Typically, the varying combustion pressure requires that the gas valve be unit specific, or an additional device is used to normalize the differential so that it is the same for all units in a model series.

The disclosure provides a gas furnace having an integrated combustion pressure conditioning system configured to condition the combustion pressure that is used to monitor the air flow through the heat exchanger of the furnace. The combustion pressure is conditioned to be at a target or within a targeted range such that a single type of pressure switch for monitoring the flow rate through a heat exchanger may be used for multiple furnace models. Additionally, the gas valve for controlling varying firing rates may be used for multiple furnace models instead of unit specific valves. With such standardization across different furnace types, manufacturing and troubleshooting costs can be reduced. Furthermore, with an integrated combustion pressure conditioning system as disclosed herein, there are fewer hoses and less of a potential for clogging of the small brass orifices that are typically associated with external pressure conditioning systems. Also, by using the integrated combustion pressure conditioning system, there is simplified construction with no external parts resulting in easier manufacturing.

To condition the combustion pressure, the disclosure provides a header box having an integrated combustion pressure conditioning system. The header box is positioned between the heat exchanger and the combustion air inducer of the furnace. By conditioning the combustion pressure, the combustion pressure signal generated by the pressure sensing device of the furnace and based on the conditioned combustion pressure, is within a known range that can be used by multiple furnace models and types to control gas valves and monitor gas flow. The combustion pressure is monitored to indicate a proper flow through the heat exchanger that is indicated by the proper pressure drop across the heat exchanger.

In one embodiment, the header box is a CEHB of a gas furnace. The CEHB is disposed between the secondary heat exchanger and the combustion air inducer of the gas furnace. The disclosed CEHB includes an integrated combustion pressure conditioning system having channels and pressure reducing orifices that are appropriately sized and positioned to condition the combustion pressure that is used to verify that the proper pressure drop and flow across the heat train of the furnace are achieved and maintained to support the combustion process within safe limits.

Turning now to FIG. 1, illustrated is an exploded isometric view of a portion of an embodiment of a furnace 100 constructed according to the principles of the disclosure. The furnace 100 may be a multi-position furnace. In some embodiments, the furnace may be a residential gas furnace. The furnace 100 includes an embodiment of a header box configured to condition the combustion pressure. The furnace 100 includes a housing 110 having a front opening 112 within which a mounting shelf 114 is located. The mounting shelf 114 has an opening 116 therein and supports a heat exchanger assembly 120 over the opening 116. The heat exchanger assembly 120 includes a primary heat exchanger 122 and a secondary heat exchanger 126. The primary heat exchanger 122 includes a row of six heat exchangers (one referenced as 124) coupled to one another. The heat exchangers are generally serpentine and have three approximately 180° folds such that the heat exchangers cross over the opening 116 four times, terminating in inlets 125 (of the primary heat exchanger 122) and outlets 127 (of the secondary heat exchanger 126) that are generally mutually coplanar and oriented toward the opening 112 of the housing 110. Alternative embodiments of the heat exchanger assembly 120 may have more or fewer heat exchangers coupled to one another in one or more rows. Additionally, alternative embodiments may have alternative heat exchanger configurations.

A burner assembly 140 contains an electronically-controlled solenoid valve 142, a manifold 144 leading from the valve 142 and across the burner assembly 140, one or more gas orifices (not shown) coupled to the manifold 144 and one or more burners (not shown) corresponding to and located proximate the gas orifices. The illustrated embodiment of the burner assembly 140 has a row of six burners. Alternative embodiments of the burner assembly 140 may have more or fewer burners arranged in one or more rows. A combustion air inlet 146 allows air in for the burner assembly 140. In an assembled configuration, the burner assembly 140 is located proximate the heat exchanger assembly 120 such that the burners thereof at least approximately align with the inlets 125.

The furnace 100 also includes a draft inducer assembly 150 including a combustion air inducer 154 and a combustion flue collar 156 coupled to an outlet of the combustion air inducer 154. In an assembled configuration, the draft inducer assembly 150 is located proximate the heat exchanger assembly 120 such that the combustion flue collar 156 approximately aligns with a flue pipe (not illustrated) that directs undesired gases (e.g., gaseous products of combustion) away from the furnace 100. Associated with the draft inducer assembly 150 are first and second drain hoses, 151, 152, that provide a path to drain condensation from the combustion flue collar 156 and the flue pipe.

A blower 160 is suspended from the shelf 114 such that an outlet (not referenced) thereof approximately aligns with the opening 116. An electronic controller 170 is located proximate the blower 160 and is configured to control the blower, the valve 142 and the combustion air inducer 154 to cause the furnace to provide heat. A cover 180 may be placed over the front opening 112 of the housing 110.

A CEHB 190 provides an interface between the combustion air inducer 154 and the secondary heat exchanger 126. The combustion air inducer 154 has an inlet coupled to the CEHB 190. In an assembled configuration, the draft inducer assembly 150 is located proximate the heat exchanger assembly 120 such that the CEHB 190 approximately aligns with the outlets 127 and the combustion flue collar 156 approximately aligns with the flue pipe.

The furnace 100 also includes a pressure sensing device 195 that is configured to monitor the combustion pressure through the heat train of the furnace 100. The pressure sensing device 195 may be a mechanical differential pressure sensing device (such as a pressure switch) or an electronic sensor which provide feedback to an integrated electronic controller of the furnace 100, such as the electronic controller 170. The pressure sensing device 195 includes inputs for determining the combustion pressure. The inputs of the pressure sensing device 195 are coupled to pressure ports of the CEHB 190. As discussed below, the pressure ports are protected from water contamination by placement of the pressure ports in channels of the CEHB 190.

Based on a differential pressure obtained by the pressure sensing device 195 from data received via the pressure ports, the gas supply for the heat exchanger 120 may be turned-off or remain off when there is improper air flow through the heat train. Additionally, the gas supply for the heat exchanger 120 may be turned-off or remain off when condensation drainage of the CEHB 190 is impaired or blocked. Thus, the same pressure sensing device 195 employing data from the pressure ports of the CEHB 195 may protect the furnace 100 from improper air flow through the heat train and protect the furnace 100 from blocked condensation drainage. The pressure sensing device 195 may be fastened to the ports of the CEHB 190 through conventional hoses. The pressure sensing device 195 may also be coupled to the electronic controller 170 or the valve 142 through conventional means. In some embodiments, the pressure sensing device 195 may be fastened to the CEHB 190.

In the illustrated embodiment, the controller 170 turns on the combustion air inducer 154 to initiate a draft in the heat exchangers (including the heat exchanger 124) and purge potentially harmful unburned or combustion gases. Then the controller 170 activates an igniter (not shown in FIG. 1) to attempt to initiate an igniter warm up period. After expiration of a predetermined igniter warm up period, controller 170 opens the valve 142 to admit gas to the manifold 144 and the one or more gas orifices, whereupon the gas begins to mix with air to form a combustible gas-air mixture. If the output of a flame sensor indicates that the gas-air mixture has not ignited within a predetermined period of time, the controller 170 then closes the valve 142 and waits until attempting to start again. If the output of a flame sensor indicates that the gas-air mixture has ignited within the predetermined period of time, the controller 170 then activates the blower 160, which forces air upward through the opening 116 and the heat exchanger assembly 120. As it passes over the surfaces of the heat exchangers, the air is warmed, whereupon it may be delivered or distributed as needed to provide heating.

Figure 2:
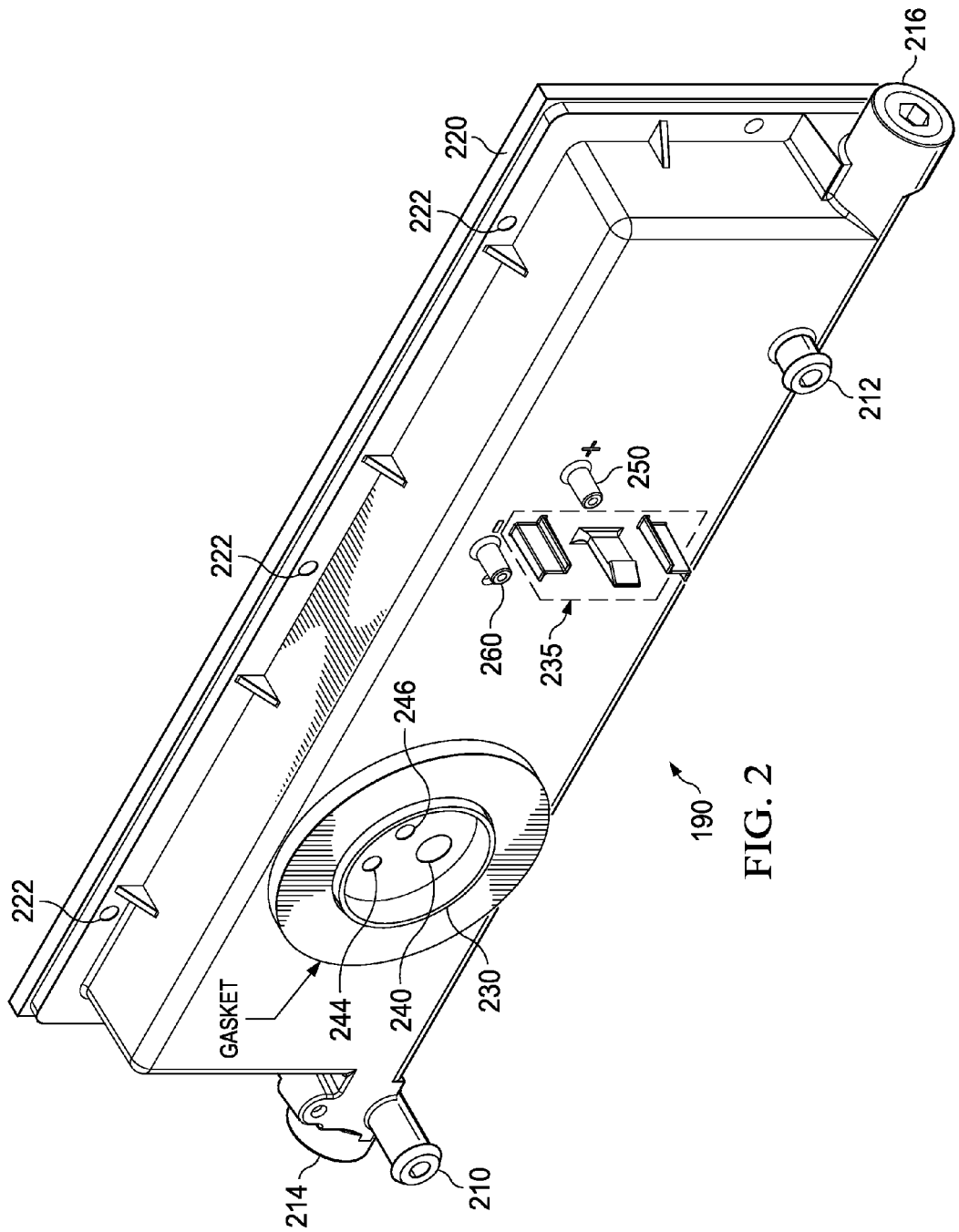
FIG. 2 is a front isometric view of an embodiment of a CEHB constructed according to the principles of the disclosure.

FIG. 2 is a front isometric view of an embodiment of a CEHB, such as the CEHB 190, constructed according to the principles of the disclosure. As noted above, the CEHB 190 is configured to provide an interface between the secondary heat exchanger 126 and the combustion air inducer 154 that draws products of combustion through the heat exchanger 120.

The CEHB 190 is configured to provide an exit for the heated gas from the heat exchanger via the secondary heat exchanger 126. The CEHB 190 is also configured to remove the condensation associated with the heated gas. As such, the CEHB 190 is typically constructed of a non-metallic material that is resistive to water corrosion. The CEHB 190, for example, may be constructed of a plastic.

The CEHB 190 may be employed in a multi-position gas furnace such as the furnace 100. Accordingly, the CEHB 190 includes components of a multi-position drain system that includes a first drain port 210, a second drain port 212, a left drain 214 and a right drain 216. The first and second drain ports 210, 212, are positioned and configured to couple to drain hoses, such as drain hoses 151, 152, from the combustion flue collar 156. Depending on the installation of the furnace 100, the left drain 214, the right drain 216 or both the left and right drains 214, 216, may be used to remove condensation from the CEHB 190.

Located on the four sides of the CEHB 190 is a flange 220 that is configured to attach the CEHB 190 to the secondary heat exchanger 126. The flange 220 includes holes, in which hole 222 is denoted, that are used to mechanically attach the CEHB 190 to the secondary heat exchanger 126. A gasket is typically used between the flange 220 and the secondary heat exchanger 126.

The CEHB 190 also includes a support collar 230 that is used to couple the combustion air inducer 154 to the CEHB 190. The support collar 230, therefore, corresponds to an inlet of the combustion air blower 154 for drawing pre-purge air and products of combustion through the heat exchanger 120. A gasket denoted in FIG. 2 is typically used with the support collar 230 for coupling the CEHB 190 to the combustion air blower 154.

Located within the circumference of the support collar 230 (and therefore within the inlet of the combustion air blower 154) is a fixed orifice 240. The fixed orifice 240 is configured to regulate gas flow through the heat exchanger 120. The fixed orifice 240 may be sized based on an input size of the furnace 100. Also located within the circumference of the support collar 230 are a negative channel supply port 244 and a positive channel supply port 246. Each of these ports in the front face of the CEHB 190 provides an opening for supplying air to the respective channels. The size and location of the fixed orifice 240, the negative channel supply port 244, the positive channel supply port 246 and the size and location of positive and negative pressure channels 270, 280, (illustrated in FIG. 3) may be determined through empirical testing to provide a target pressure or pressure range as detected by a pressure sensing device for determining combustion pressure.

The CEHB 190 also includes a connection system 235 having alignment protrusions as denoted in FIG. 2 that are used to couple the pressure sensing device 195 to the CEHB 190. The connection system 235 and the corresponding protrusions may vary depending on the type or model of pressure sensing device to be attached to the CEHB 190.

Figure 3:
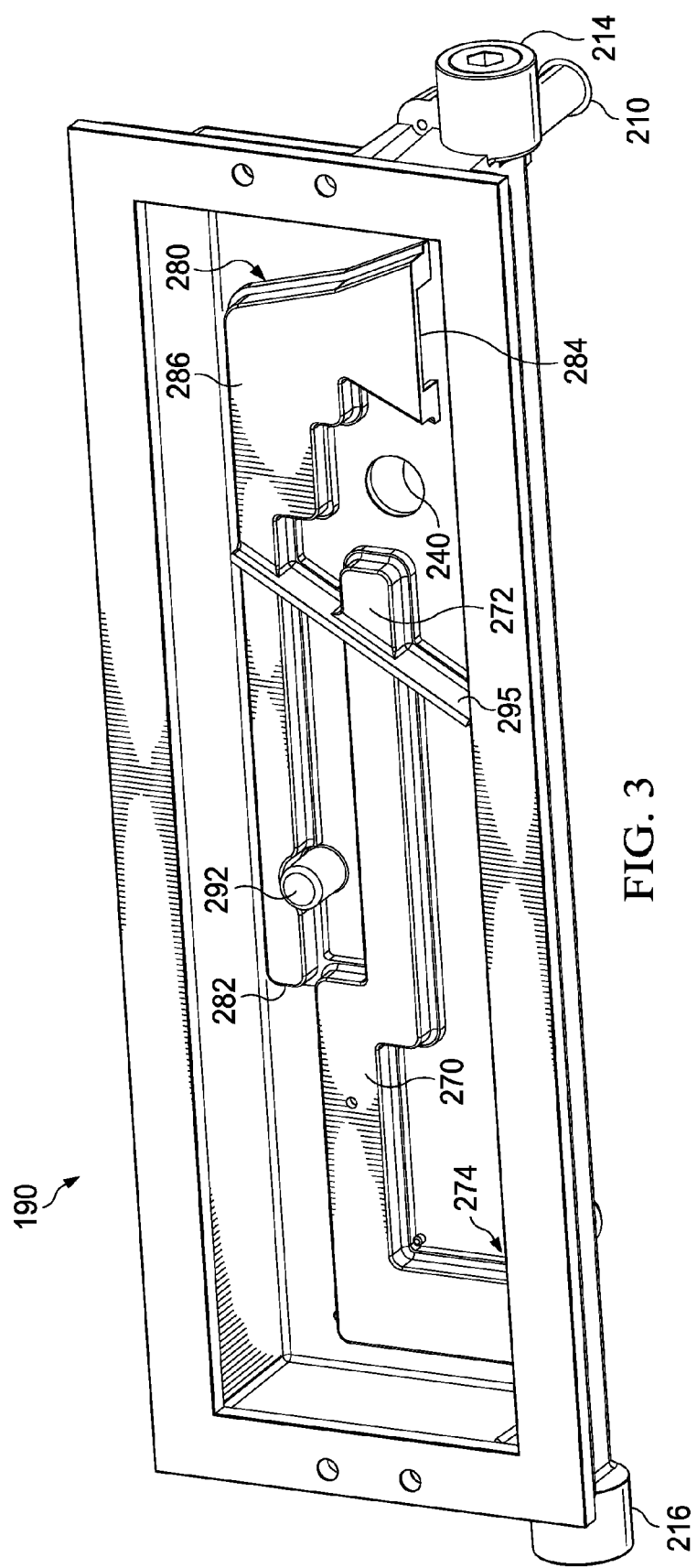
FIG. 3 is a rear isometric view of the CEHB of FIG. 2.

The CEHB 190 further includes a positive pressure port 250 and a negative pressure port 260 that are coupled to a positive input and a negative input of a pressure sensing device, such as the pressure sensing device 195. The pressure sensing device is configured to monitor a combustion pressure across the fixed orifice 240 based on data received at the negative input port and the positive input port via the negative and positive pressure ports 250, 260. The negative and positive pressure ports 250, 260, are typically coupled to the pressure sensing device via pressure sensing device hoses. The positive pressure port 250 is located within the positive pressure channel 270 and the negative pressure port 260 is located within the negative pressure channel 280 as illustrated in FIG. 3. Locating the positive pressure port 250 and the negative pressure port 260 within the respective channels and away from openings of the respective channels protects the pressure ports and the pressure sensing device from condensation produced during the combustion process.

The CEHB 190 further includes a screw mounting lug 292 and a water dam 295. The screw mounting lug 292 is used when mounting a combustion air inducer to the CEHB 190. The water dam 295 is a condensate water dam that is configured to direct water away from sensitive areas of the CEHB 190 and assists in maintaining a stable pressure signal.

FIG. 3 is a rear isometric view of the CEHB 190 that illustrates the positive pressure channel 270 and the negative pressure channel 280. Though not visible in FIG. 3, the positive pressure channel 270 includes the positive pressure port 250. During normal operation, the positive pressure channel 270 has the same or about the same pressure as the CEHB 190. As such, locating the positive pressure port 250 within the positive pressure channel 270 allows measuring of the combustion pressure while protecting the positive pressure port 250 from condensation. Other components of the positive pressure channel 270 and the negative pressure channel 280 that are not visible in FIG. 3 (or FIG. 2) include the negative channel supply port 244, the positive channel supply port 246 and a flow restriction orifice located within the positive pressure channel 270. Additionally, the negative pressure channel 280 includes bleed ports that are not visible in FIG. 2 or FIG. 3. The bleed ports are configured to reduce the pressure received through the negative channel supply port 244 to a targeted range when measured at the negative pressure port 260. The bleed ports are denoted in FIG. 4. A size, configuration and location of the channels 270, 280, and the various components thereof may be determined through empirical testing to provide a target pressure or pressure range when detected by a pressure sensing device to correlate to a targeted pressure drop or flow thru the heat exchanger.

Figure 4:
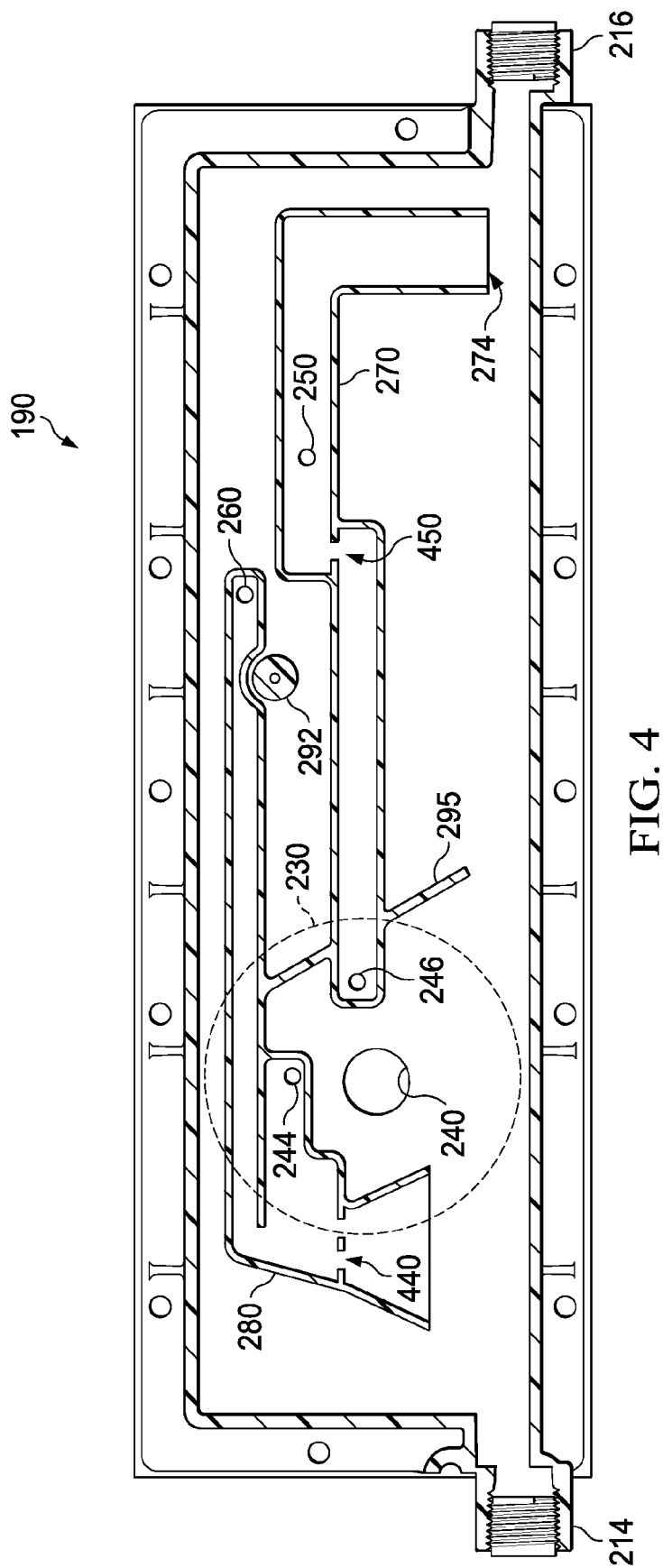
FIG. 4 is a functional view of an embodiment of a CEHB constructed according to the principles of the disclosure.

A first end of the positive pressure channel 270, an inlet end 272, extends within the support collar 230 as illustrated within FIG. 4. A second end of the positive pressure channel 270, a pressure reference inlet 274, opens toward the side of the CEHB 190 having drain 216. The positive pressure channel 270 has a quadrilateral cross section and includes four sections that are joined at or about 90 degrees to form a continuous open channel from the inlet end 272 to the pressure reference inlet 274.

Though not visible in FIG. 3, the negative pressure channel 280 includes the negative pressure port 260. The negative pressure channel 280 is configured to reduce the high negative pressure that is present at the inlet of the combustion air inducer 154 to a targeted pressure or pressure range at the negative pressure port 260. As such, locating the negative pressure port 260 within the negative pressure channel 280 allows measuring of the combustion pressure signal while protecting the negative pressure port 260 from condensation. The negative pressure channel 280 includes a first end denoted as a closed end 282. A second end of the negative pressure channel 280, an open end 284, opens toward the side of the CEHB 190 having the drain 214, The negative pressure channel 280 has a quadrilateral cross section and includes four sections that are joined to form a continuous open channel from the closed end 282 to the open end 284.

Located within a supply section 286 of the negative pressure channel 280 is the negative channel supply port 244. A portion of the supply section 286 including the negative channel supply port 244 is located within the circumference of the support collar 230 and, therefore, the corresponding inlet of the combustion air inducer 154. Sides of the negative pressure channel 280 around the open end 284 are shaped to provide a water shroud to protect the negative pressure port 260 from contamination.

The negative channel supply port 244 is positioned to be in fluid communication with the inlet of the combustion air inducer. The negative pressure port 260 in the negative pressure channel 280 is couplable to an input, such as a negative input, of a pressure sensor device. Similarly, the positive pressure channel supply port 246 is positioned to be in fluid communication with the inlet of the combustion air blower and the positive pressure port 250 is couplable to an input, such as a positive input, of the pressure sensor device. The positive pressure channel 270 and the negative pressure channel 280 are in fluid communication and are configured to have about a same pressure when the pressure reference inlet 274 is blocked (e.g., blocked by condensation). The CEHB 190 is designed wherein this is true even when the furnace including the CEHB 190 is installed in multiple positions. During operation of the combustion air blower when the pressure reference inlet 274 is not blocked (i.e., during normal operation when there is proper drainage), the positive pressure channel 270 is configured to have a positive pressure compared to negative pressure channel 280.

FIG. 4 is a functional view of an embodiment of a CEHB, the CEHB 190, constructed according to the principals of the disclosure. FIG. 4 provides a cutaway of the CEHB 190 to more clearly illustrate an integrated combustion pressure conditioning system and the operation thereof. An integrated combustion pressure conditioning system includes the channels and components located within the channels that are used to reduce the pressure within the inlet of the combustion air inducer 154 to a target pressure range or target pressure for multiple furnace models. In FIG. 4, an embodiment of an integrated combustion pressure conditioning system is illustrated that includes the positive and negative pressure channels 270, 280, and the negative and positive channel supply ports 244, 246. Additional components of the illustrated embodiment of the integrated combustion pressure conditioning system include bleed ports 440 of the negative pressure channel 280 and a flow restriction orifice 450 of the positive pressure channel 270. In other embodiments, the integrated combustion pressure conditioning system may include additional orifices, bleed ports, or different shaped channels to condition the pressure at the combustion air inducer inlet. By reducing the combustion air inducer inlet pressure to a targeted range, a single pressure sensing device can be used for multiple furnace models. By having the pressure conditioning system built-in as part of a header box, such as the CEHB 190, external components for conditioning a pressure signal are not needed.

The bleed ports 440 are designed to bleed down the negative pressure that is received via the negative pressure channel supply port 244. The bleed ports 440 are positioned in the CEHB 190 to be free from water contamination. The location and size of the bleed ports are selected to normalize the high negative pressure in the inlet zone of the combustion air inducer 154 to a targeted pressure value or range of values at the negative pressure port 260. As such, a single type of pressure sensing device can be used for various models.

Figure 5:
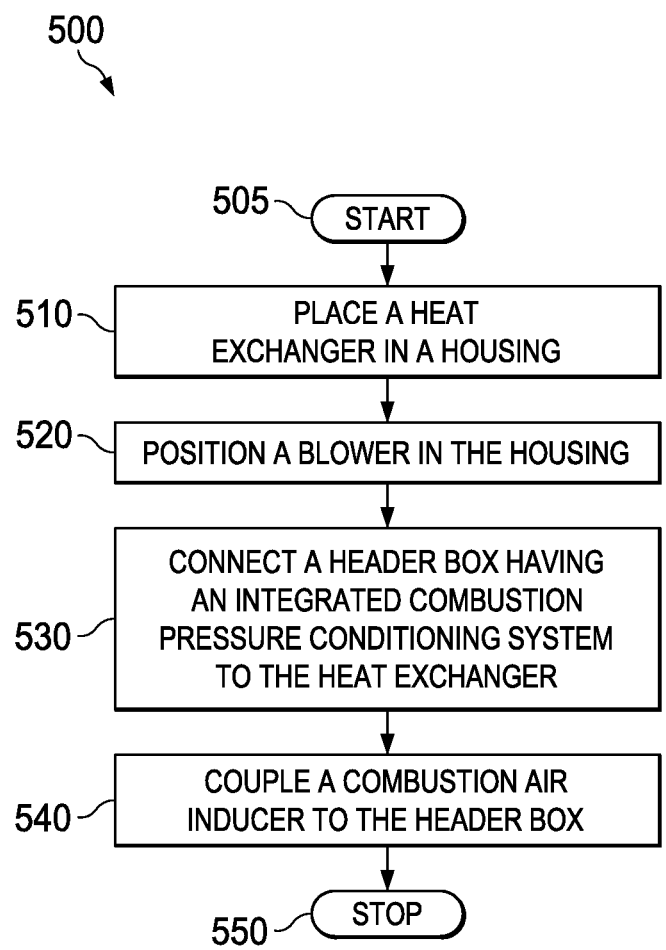
FIG. 5 is a flow diagram of an embodiment of a method of constructing a CEHB carried out according to the principles of the disclosure.

Turning now to FIG. 5, illustrated is flow diagram of an embodiment of a method 500 of constructing a furnace carried out according to the principles of the disclosure. The furnace may be a residential, multi-position gas furnace. The method 500 begins in a step 505.

In a step 510, a heat exchanger is placed in a housing. The housing may be a cabinet, such as a metal cabinet. The heat exchanger may include a primary and a secondary heat exchanger.

A blower is positioned in the housing to move air across the heat exchanger in a step 520. The blower may be coupled to the housing or a shelf of the housing. The blower may be a variable blower.

In a step 530, a header box is connected to the heat exchanger. The header box includes an integrated combustion pressure conditioning system that is configured to condition a combustion pressure of the furnace. The header box may be a cold end header box that is coupled to a secondary heat exchanger of the heat exchanger.

In a step 540, a combustion air inducer is coupled to the header box. The header box may include a support collar and a connection system having alignment protrusions for coupling the combustion air inducer to the header box. The method 500 then ends in a step 550.

Those skilled in the art to which this application relates will appreciate that other and further additions, deletions, substitutions and modifications may be made to the described embodiments.

What is claimed is:

1. A cold end header box configured to be coupled to a secondary heat exchanger of a gas furnace, comprising:
    a fixed orifice configured to regulate air flow through a heat exchanger of said furnace, wherein a combustion air inducer induces said air flow; and
    a negative pressure channel including a negative channel supply port that communicates with an inlet of said combustion air inducer, a negative pressure port configured to connect to a negative input port of a pressure switch and bleed ports configured to reduce a pressure received through said negative channel supply port at said inlet to a targeted range at said negative pressure port, said pressure switch configured to monitor a combustion pressure through said heat exchanger.

2. The cold end header box as recited in claim 1 further comprising a positive pressure channel having a positive pressure port configured to connect to a positive input port of said pressure switch, wherein said pressure switch monitors said combustion pressure by measuring a differential pressure across said fixed orifice via data received at said negative input port and said positive input port.

3. The cold end header box as recited in claim 1 wherein said negative pressure channel includes a water shroud coupled to said bleed ports and configured to protect said bleed ports from water contamination.

4. The cold end header box as recited in claim 1 further comprising a support collar for coupling said cold end header box to said combustion air inducer, wherein said support collar corresponds to said inlet of said combustion air inducer.

5. The cold end header box as recited in claim 4 wherein said fixed orifice is located within a circumference of said support collar.

6. The cold end header box as recited in claim 1 wherein said fixed orifice is sized based on an input size of said furnace.

7. The cold end header box as recited in claim 1 wherein said negative pressure channel includes a closed end and said negative pressure port is proximate said closed end.

8. The cold end header box as recited in claim 2 wherein said positive pressure channel includes an inlet end having a positive pressure channel supply port.

9. The cold end header box as recited in claim 8 wherein said positive pressure channel supply port is located within a circumference of said support collar.

10. The cold end header box as recited in claim 1 wherein said negative channel supply port and said bleed ports are sized and positioned within said negative pressure channel to provide said targeted range at said negative pressure port.

11. A furnace, comprising:
a heat exchanger;
a combustion air inducer configured to generate air flow through said heat exchanger;
a pressure switch configured to monitor a combustion pressure through said heat exchanger; and
a header box configured to be coupled between said heat exchanger and said combustion air inducer, said header box comprising:
a fixed orifice configured to regulate said air flow; and
a negative pressure channel including a negative channel supply port that communicates with an inlet of said combustion air inducer, a negative pressure port configured to connect to a negative input port of said pressure switch and bleed ports configured to reduce a pressure received through said negative channel supply port at said inlet to a targeted range at said negative pressure port.

12. The furnace as recited in claim 11 wherein said header box further includes a positive pressure channel having a positive pressure port configured to connect to a positive input port of said pressure switch, wherein said pressure switch monitors said combustion pressure by measuring a differential pressure across said fixed orifice via data received at said negative input port and said positive input port.

13. The furnace as recited in claim 11 wherein said negative pressure channel includes a water shroud coupled to said bleed ports and configured to protect said bleed ports from water contamination.

14. The furnace as recited in claim 11 wherein said header box further includes a support collar for coupling thereto said combustion air inducer, wherein said support collar corresponds to said inlet of said combustion air inducer.

15. The furnace as recited in claim 14 wherein said positive pressure channel includes an inlet end having a positive pressure channel supply port.

16. The furnace as recited in claim 15 wherein said fixed orifice, said positive pressure channel supply port and said negative pressure channel supply port are located within a circumference of said support collar.

17. The furnace as recited in claim 11 wherein said fixed orifice is sized based on an input size of said furnace.

18. The furnace as recited in claim 11 wherein said negative channel supply port and said bleed ports are sized and positioned within said negative pressure channel to provide said targeted range at said negative pressure port.

19. The furnace as recited in claim 11 wherein said header box is a cold end header box.

20. A method of constructing a furnace, comprising:
placing a heat exchanger in a housing;
positioning a blower in said housing wherein said blower can move air across said heat exchanger; and
connecting a header box to said heat exchanger, wherein said header box includes:
a fixed orifice configured to regulate said air flow and
a negative pressure channel including a negative channel supply port that communicates with an inlet of said combustion air inducer, a negative pressure port configured to connect to a negative input port of said pressure switch and bleed ports configured to reduce a pressure received through said negative channel supply port at said inlet to a targeted range at said negative pressure port.

* * * * *